United States Patent [19]

Knipe et al.

[11] Patent Number: 5,739,941
[45] Date of Patent: Apr. 14, 1998

[54] NON-LINEAR HINGE FOR MICRO-MECHANICAL DEVICE

[75] Inventors: Richard L. Knipe, McKinney, Tex.; Douglas A. Webb, Chandler, Ariz.

[73] Assignee: Texas Instruments Incorporated, Dallas, Tex.

[21] Appl. No.: 504,861

[22] Filed: Jul. 20, 1995

[51] Int. Cl.$^6$ .................................................. G02B 26/00
[52] U.S. Cl. .......................................... 359/224; 359/290
[58] Field of Search .............................. 16/308, 225, 227; 350/269, 320; 359/224, 225, 290

[56] References Cited

U.S. PATENT DOCUMENTS

| | | | |
|---|---|---|---|
| 434,212 | 8/1890 | Taxis | 16/308 |
| 2,733,476 | 2/1956 | Eck | 16/308 |
| 4,705,365 | 11/1987 | Wakita et al. | 359/224 |
| 4,921,231 | 5/1990 | Reynolds et al. | 16/308 |
| 4,956,619 | 9/1990 | Hornbeck | 330/4.3 |
| 5,061,049 | 10/1991 | Hornbeck | 359/224 |
| 5,535,047 | 7/1996 | Hornbeck | 359/224 |

FOREIGN PATENT DOCUMENTS 318969  6/1989  European Pat. Off. ............... 16/308

*Primary Examiner*—Chuck Mah
*Assistant Examiner*—Donald M. Gurley
*Attorney, Agent, or Firm*—Julie L. Reed; James C. Kesterson; Richard L. Donaldson

[57] ABSTRACT

A non-linear torsion hinge (12, 22) for a micro-mechanical device (10, 20) having a hinged movable element (11, 21). Each hinge (22) is comprised of two hinge strips (22a) spaced apart in the same plane, such that the axis of rotation of at least one of the hinge strips (22a) is different from the axis of rotation of the movable element (21). As a result, the hinge strip (22a) must elongate as it twists, thereby providing a greater restoring torque.

11 Claims, 3 Drawing Sheets

NON-LINEAR HINGE FOR MICRO-MECHANICAL DEVICE

TECHNICAL FIELD OF THE INVENTION

This invention relates to micro-mechanical devices, and more particularly, to such devices having one or more movable elements that rotate by means of a torsion hinge.

BACKGROUND OF THE INVENTION

A recent development in the field of electro-mechanics has been the miniaturization of various mechanical devices. Typical of such devices are tiny gears, levers, and valves. These "micro-mechanical" devices are manufactured using integrated circuit techniques, often together with electrical control circuitry. Common applications include accelerometers, pressure sensors, and actuators. As another example, spatial light modulators can be configured from micro-mechanical reflective mirror elements.

One type of micro-mechanical device is a digital micro-mirror device (DMD), sometimes referred to as a deformable mirror device. The DMD has an array of hundreds or thousands of tiny tilting mirrors. Light incident on the DMD is selectively reflected or not reflected from each mirror to an image plane, to form images. To permit the mirrors to tilt, each mirror is attached to one or more torsion hinges. The mirrors are spaced by means of air gaps, over underlying control circuitry. The control circuitry provides electrostatic forces, which cause each mirror to selectively tilt. For optimal operation, each mirror should promptly return to its untilted (equilibrium) position when desired.

Other micro-mechanical devices can be envisioned that also use torsion hinges. As with the DMD, it is desirable to design hinges that are self-restoring to their equilibrium position.

SUMMARY OF THE INVENTION

One aspect of the invention is an improved micro-mechanical device of a type having at least one rotating element that is supported by a torsion hinge, such that the rotating element may rotate about an axis of rotation. The hinge is comprised of at least two hinge strips. These hinge strips are spaced apart in the same plane, such that the axis of rotation of at least one of the hinge strips is substantially parallel to, but offset from, the axis of rotation of the rotating element.

An advantage of the invention is that it provides a hinge whose torque increases non-linearly with the angle of rotation of the rotating element to which the hinge is attached. For a hinge that is operated by means of electrostatic attraction, this non-linear torque corresponds to the non-linear force of the applied electric field. As a result, the hinge has greater restoring force, and the applied force for initializing rotation can remain relatively small. A rotating element that lands on another surface will land less abruptly.

DETAILED DESCRIPTION OF THE INVENTION

For purpose of example, the following description is in terms of a particular type of micro-mechanical device, a "digital micro-mirror device" (DMD), sometimes also referred to as a "deformable mirror device". As described in the Background, a DMD is comprised of tiny hinged mirrors, each supported over a substrate of control circuitry. The invention is directed to an improved torsion hinge, where by "torsion hinge" is meant a hinge that operates by twisting as opposed to bending.

One application of DMDs is for forming images, where the DMD has an array of deflectable mirrors that selectively reflect light to an image plane. The images formed by the DMD can be used in display systems or for non-impact printing applications. Other applications of DMDs are possible that do not involve image formation, such as optical steering, optical switching, and accelerometers. In some of these applications, the "mirror" need not be reflective. Also, in some applications, the DMD is operated in an analog rather than a digital mode. In general, the term "DMD" is used herein to include any type of micro-mechanical device having at least one hinge-mounted deflectable element that is spaced by an air gap from a substrate, relative to which it moves.

The invention could also be useful for other types of micro-mechanical devices that have rotating elements attached to torsion hinges. Like the DMD's mirror elements, other micro-mechanical devices may have rotating parts whose motion is due to twisting of the torsion hinge. The same concepts as discussed herein for a DMD hinge could apply to any micro-mechanical torsion hinge.

Figure 1:
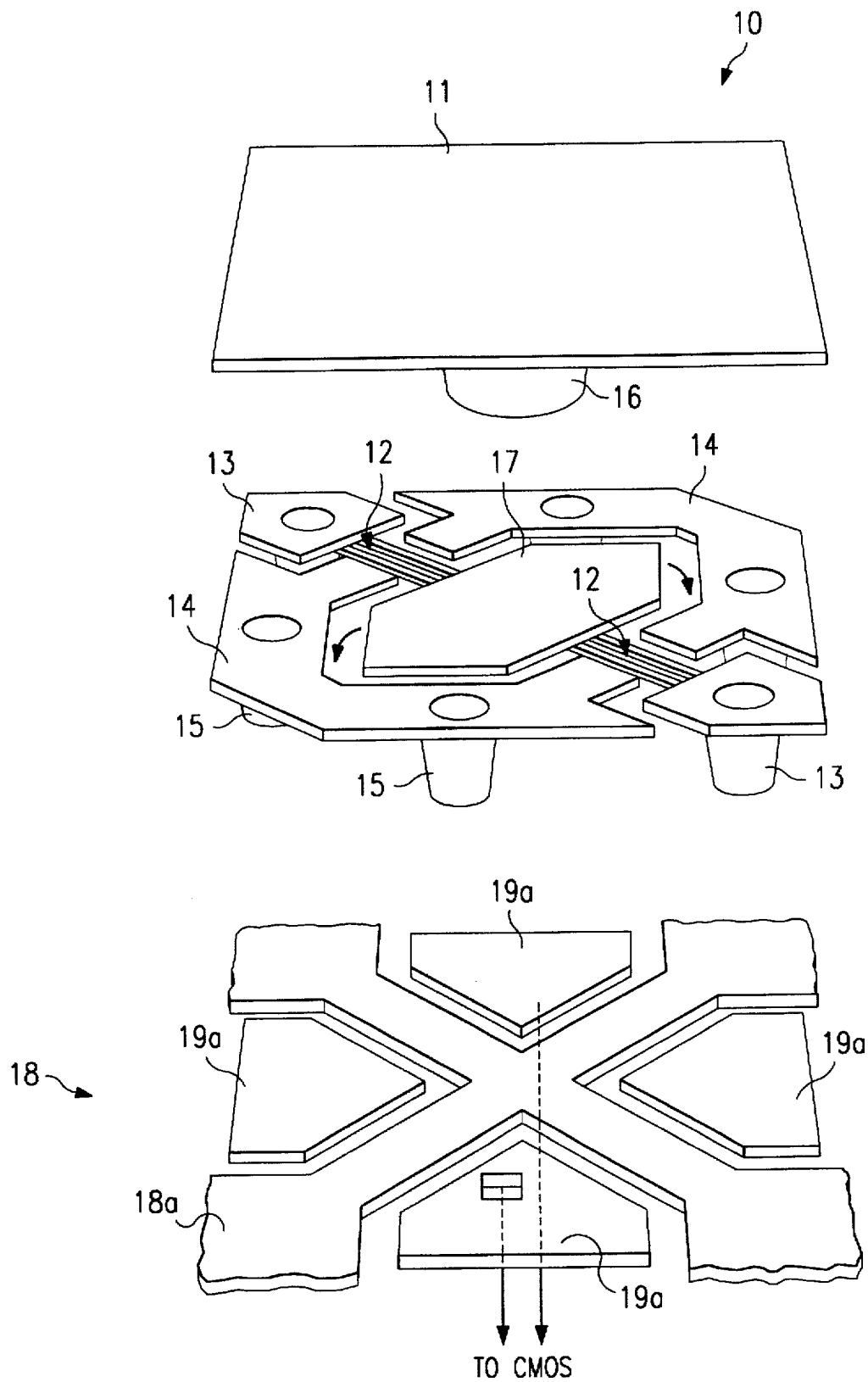
FIG. 1 is an exploded perspective view of a hidden hinge type mirror element of a digital micro-mirror device (DMD), having non-linear hinges in accordance with the invention.

FIG. 1 is an exploded perspective view of a single mirror element 10 of a DMD. In FIG. 1, the mirror 11 is undeflected, but as indicated by the arrows, its torsion hinges 12 permit it to be deflected in either of two directions. As indicated above various DMD applications may use such mirror elements 10 singly or in arrays.

The mirror element 10 of FIG. 1 is known as a "hidden hinge" mirror element. Other types of mirror elements 10 can be fabricated, including a "torsion beam" type, described below in connection with FIG. 2, where the mirror is mounted directly to the hinges instead of over a yoke to which the hinges are attached. Various DMD types are described in U.S. Pat. No. 4,662,746, entitled "Spatial Light Modulator and Method"; U.S. Pat. No. 4,956,610, entitled "Spatial Light Modulator"; U.S. Pat. No. 5,061,049 entitled "Spatial Light Modulator and Method"; U.S. Pat. No. 5,083,857 entitled "Multi-level Deformable Mirror Device"; and U.S. patent application Ser. No. 08/171,303, entitled "improved Multi-Level Micro-Mirror Device". Each of these patents is assigned to Texas Instruments incorporated and each is incorporated herein by reference.

As with other hidden hinge DMD designs, the hinges 12 of mirror element 10 are supported by hinge support posts 13, which are formed on a substrate. Address electrodes 14 are supported by electrode support posts 15, which are on the same level as hinges 12 and hinge support posts 13.

Mirror support post 16 is fabricated on a landing yoke 17. Landing yoke 17 is attached to one end of each of the two hinges 12. The other end of each hinge 12 is attached to a hinge support post 13. The hinge support posts 13 and the electrode support posts 15 support the hinges 12, address electrodes 14, and yoke 17 over a substrate having landing pads 18a and address electrodes 18b. When mirror 11 is tilted, the tip of the landing yoke 17 contacts a landing pad 18a of substrate 18. The landing pads 18a and address electrodes 18b have appropriate electrical connections to memory cells (not shown), which are typically fabricated within the same substrate 18 using CMOS fabrication techniques.

Figure 2:
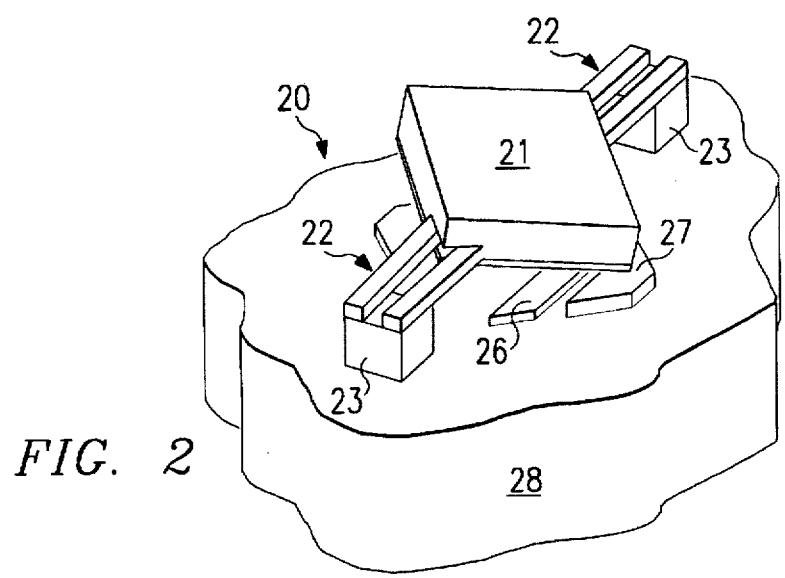
FIG. 2 is a perspective view of a torsion beam type mirror element of a DMD, having non-linear hinges in accordance with the invention.

FIG. 2 illustrates a mirror element 20 of a torsion beam type DMD. The hinges 22 are not hidden, but rather extend from opposing sides of mirror 21. Hinges 22 are attached to hinge support posts 23. Address electrodes 26 provide attractive forces for tilting the mirror 21, which touches a landing pad 27. The mirror element 20 is fabricated over a substrate 28 of memory cells and control circuitry.

Many variations of the designs of FIGS. 1 and 2 are possible. For example, the yoke 17 (or mirror 21) could be notched so that the hinges 12 (or 22) are set in. The hinges 12 (or 22) could be attached at a side of yoke 17 (or mirror 21) as in FIG. 1 or at a corner as in FIG. 2. Furthermore, the hinge attachment need not be at opposing corners or sides. The hinges could be attached so as to permit asymmetric tilting.

In operation for image display applications, and using an array of mirror elements 20 for example, a light source illuminates the surface of the DMD. A lens system may be used to shape the light to approximately the size of the array of mirror elements 20 and to direct this light toward them. Voltages based on data in the memory cells of substrate 28 are applied to the address electrodes 26. Electrostatic forces between the mirrors 21 and their address electrodes 26 are produced by selective application of voltages to the address electrodes 26. The electrostatic force causes each mirror 21 to tilt either about +10 degrees (on) or about -10 degrees (off), thereby modulating the light incident on the surface of the DMD. Light reflected from the "on" mirrors 21 is directed to an image plane, via display optics. Light from the "off" mirrors 21 is reflected away from the image plane. The resulting pattern forms an image. The proportion of time during each image frame that a mirror 21 is "on" determines shades of grey. Color can be added by means of a color wheel or by a three-DMD setup.

In effect, the mirror 21 and its address electrodes 26 form capacitors. When appropriate voltages are applied to mirror 21 and its address electrodes 26, a resulting electrostatic force (attracting or repelling) causes the mirror 21 to tilt toward the attracting address electrode 26 or away from the repelling address electrode 26. The mirror 21 tilts until its edge contacts an underlying landing pad 27. Once the electrostatic force between the address electrodes 26 and the mirror 21 is removed, the energy stored in the hinges 22 provides a restoring force to return the mirror 21 to an undeflected position. Appropriate voltages may be applied to the mirror 21 or address electrodes 26 to aid in returning the mirror 21 to its undeflected position.

One aspect of the invention is the recognition that as the mirror 21 (or yoke 17) rotates, the electric field increases non-linearly. To prevent abrupt landings and to provide a strong restoring force, the hinges 22 (or 12) should respond non-linearly. As explained below, this is accomplished by making each hinge 12 and 22 from two adjacent hinge strips.

Figure 3:
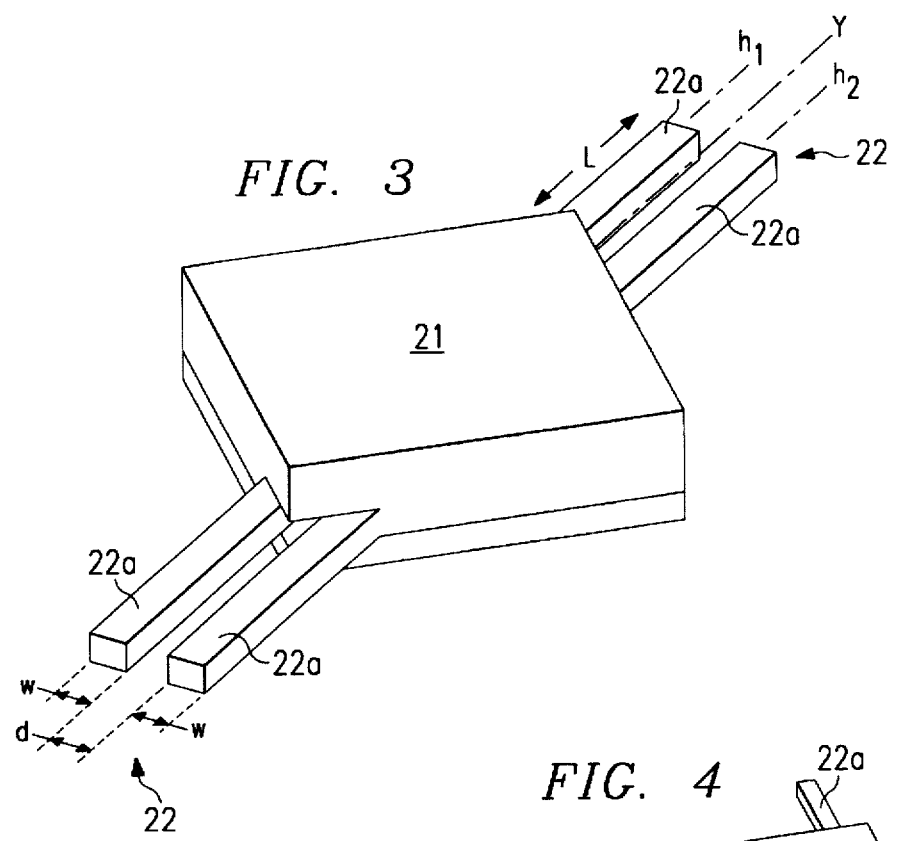
FIG. 3 illustrates the hinges of FIGS. 1 and 2 in further detail.

FIG. 3 illustrates mirror 21 and hinges 22 in further detail. The yoke 17 and hinges 12 of mirror element 10 are structurally and operationally equivalent for purposes of this invention. The axis of rotation of mirror 21 is along Y—Y. Each hinge 22 is comprised of a pair of hinge strips 22a, which are spaced apart in the same plane. Each hinge strip 22a has its own axis of rotation. In the example of this description, the hinge strips 22a of each hinge are aligned, so that there are two axes of rotation, $h_1$—$h_1$ and $h_2$—$h_2$. As illustrated, these axes of rotation are parallel to, but are displaced from, the axis of rotation of mirror 21. As a result, during rotation of mirror 21, the hinge strips 22a are elongated. The increased force required to elongate the hinge strips 22a results in an increase in restoring torque.

Hinges 22 in accordance with the invention can be incorporated into the DMD fabrication process by etching two hinge strips 22a per side of mirror 21 rather than a one-piece hinge. A typical DMD has a mirror 21 that is about 16 micrometers square. For this size mirror 21, hinge strips 22a have a width, w, of about 1 micrometer. Their length is about 4 micrometers. The distance between them, d, is about 1 micrometer. The w and d dimensions are limited by photo lithographic capabilities; better resolving capabilities might permit smaller dimensions.

Figure 4:
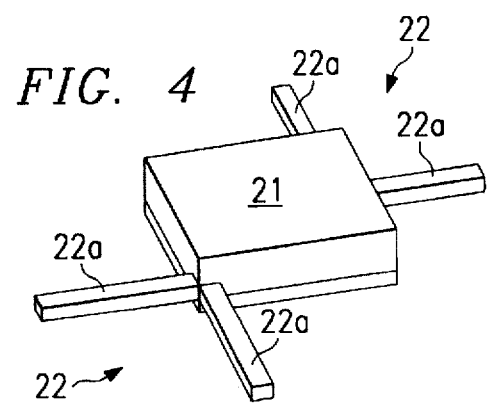
FIG. 4 illustrates an alternative embodiment of the hinges of FIGS. 1 and 2.

The amount of hinge elongation per degree of pixel rotation can be adjusted by the separation distance between the hinge strips 22a in the hinge 22. A larger separation distance will produce a larger degree of nonlinearity. A small angle approximation of the additional hinge elongation produced by a given separation distance, d, is:

$$\epsilon_{elongation} = 0.5(d\theta/2L)^2,$$

where $\epsilon_{elongation}$=elongation strain
d=separation distance between adjacent hinges
θ=mirror rotation angle
L=hinge length FIG. 4 illustrates an alternative embodiment of hinges 22. Hinges 12 could be similarly modified. Instead of being parallel to each other, the hinge strips 22a in each hinge 22 form a V-shape. This design permits the hinge shape to accommodate surrounding structure.

Figure 5:
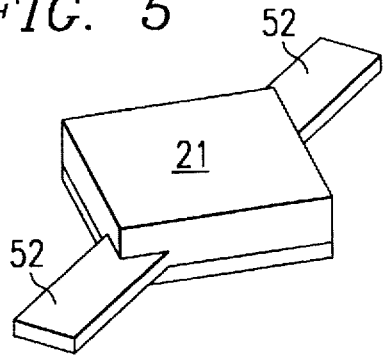
FIG. 5 illustrates an alternative type of non-linear hinge.

FIG. 5 illustrates a hinge 52 that is an alternative embodiment of hinge 22. Instead of having two spaced hinge strips, each hinge 52 is wide. The ratio of its width to its length is sufficiently large so as to result in non-linear torque as the angle of rotation of mirror 21 increases. Hinge 12 could be similarly modified. An example of a wide hinge 52 is one that is 2 micrometers wide and 4 micrometers long.

Figure 6:
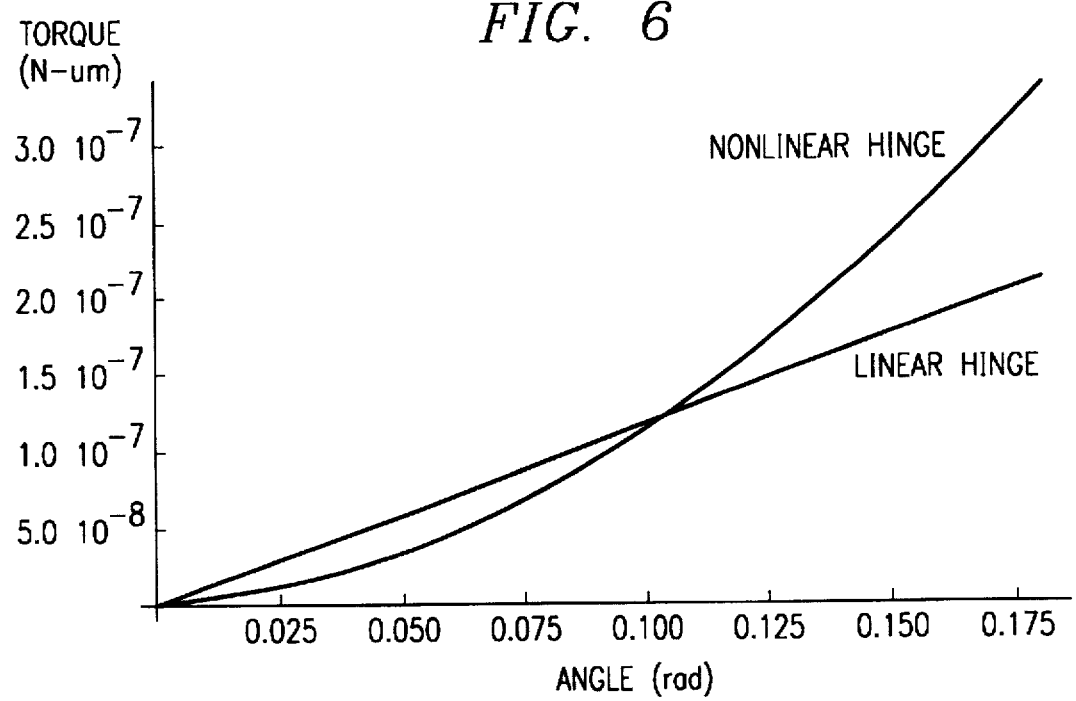
FIG. 6 illustrates the non-linear torque-angle relationship of a micro-mechanical hinge in accordance with the invention, as compared to a conventional micro-mechanical hinge.

FIG. 6 illustrates the torque-angle relationship between a non-linear hinge in accordance with the invention and a conventional micro-mechanical hinge. The non-linear hinge has two strips 1 micrometer wide, 4 micrometers long, and 1 micrometer apart. The linear hinge is a single piece 1 micrometer wide and 4 micrometers long. For the linear hinge, whose axis of rotation corresponds to that of the mirror, the torque-angle relationship is linear.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An improved micro-mechanical device having at least one rotating element that is supported by a hinge, such that said rotating element may rotate about an axis of rotation, wherein said improvement comprises:

said hinge being comprised of at least two hinge strips, said hinge strips being parallel and laterally spaced apart in the same plane, such that the axis of rotation of at least one of said hinge strips is parallel to, but offset from, the axis of rotation of said rotating element, and wherein said hinges strips have dimensions of width relative to length such that edges of said hinge undergo a non-linear elongation strain when said rotating element rotates.

2. The improved micro-mechanical device of claim 1, wherein said hinge strips are substantially parallel.

3. The improved micro-mechanical device of claim 1, wherein said hinge strips each have a width of approximately 1 micrometer.

4. The improved micro-mechanical device of claim 1, wherein said hinge strips are spaced approximately 1 micrometer apart.

5. The improved micro-mechanical device of claim 1, wherein said hinge strips each have a ratio of width to length of approximately 1:4.

6. An improved micro-mechanical device having at least one rotating element that is supported by a hinge, such that said rotating element may rotate about an axis of rotation, wherein said improvement comprises:

said hinge being comprised of at least two hinge strips, said hinge strips being spaced apart in the same plane at one end of said strips which connect to said element, and connected together at the opposite end of said hinge strips, such that said hinge strips substantially form a V-shape and wherein said hinge strips have dimensions of width relative to length such that edges of said hinge undergo a non-linear elongation strain when said rotating element rotates.

7. A digital micro-mirror device (DMD), comprising:

a substrate upon which the following elements are fabricated: at least one landing electrode, a support post, at least one hinge extending from said support post, a mirror attached to said hinge, wherein said at least one hinge is deformable so as to permit said mirror to move toward said landing electrode upon being subjected to an applied force; and said hinge being comprised of at least two hinge strips, said hinge strips being parallel and laterally spaced apart in the same plane, such that an axis of rotation of at least one of said hinge strips is parallel to, but offset from, an axis of rotation of said mirror, and wherein said hinge strips have dimensions of width relative to length such that edges of said hinge undergo a non-linear elongation strain when said mirror rotates.

8. The device of claim 7, wherein said hinge strips are substantially parallel.

9. The device of claim 7, wherein said hinge strips each have a width of approximately 1 micrometer.

10. The device of claim 7, wherein said hinge strips are spaced approximately 1 micrometer apart.

11. The device of claim 7, wherein said hinge strips each have a ratio of width to length of approximately 1:4.

* * * * *